J. P. BROWER.
CORN-STALK CUTTER.

No. 190,118. Patented May 1, 1877.

Attest:
Alexander Mahon
John G. Center

Inventor:
Jonathan P. Brower
by A. M. Smith, Atty

UNITED STATES PATENT OFFICE.

JONATHAN P. BROWER, OF CORNSTALK, INDIANA.

IMPROVEMENT IN CORN-STALK CUTTERS.

Specification forming part of Letters Patent No. 190,118, dated May 1, 1877; application filed November 9, 1876.

*To all whom it may concern:*

Be it known that I, JONATHAN P. BROWER, of Cornstalk, county of Howard, State of Indiana, have invented certain new and useful Improvements in Corn-Stalk Cutters, of which the following is a full, clear, and exact description, reference being had to the accompanying drawing, making part of this specification, in which—

Figure 1:
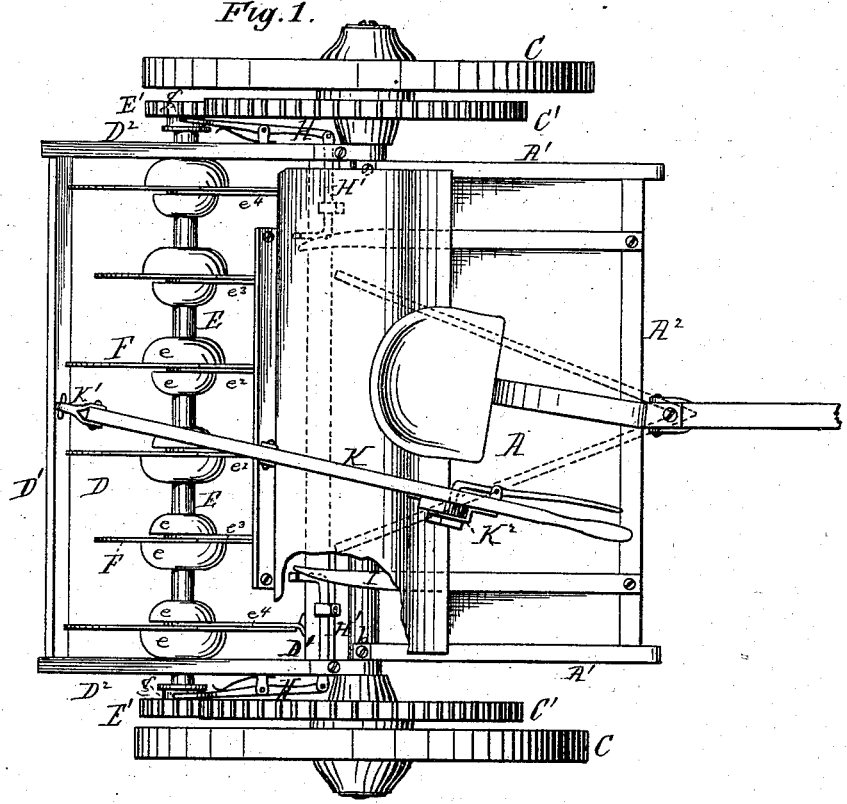
Figure 2:
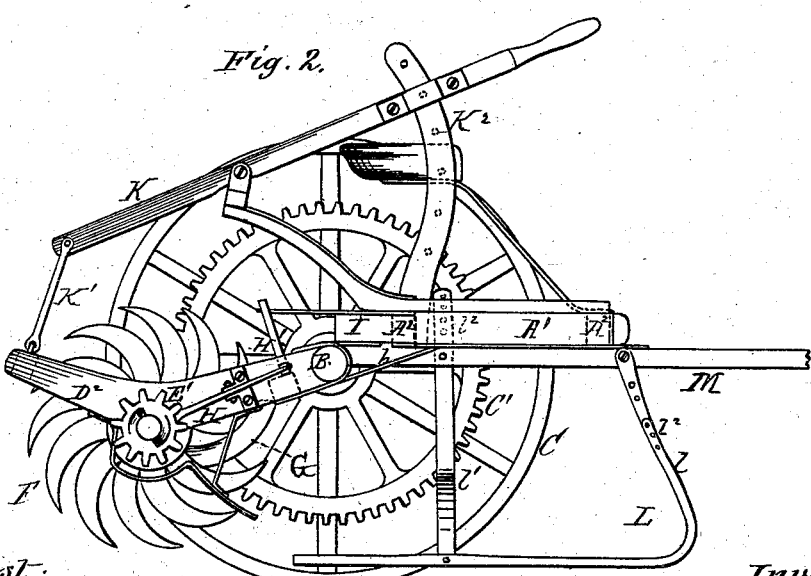

Figure 1 is a plan or top view of my improved stalk-cutter. Fig. 2 is a side view of the same with one of the wheels removed.

My invention consists in a novel construction and arrangement of rotating cutters in combination with stationary cutters or knives, whereby the rotating cutters act as gathering-teeth for picking up the stalks and presenting them to the stationary cutters, which assist the revolving cutters in severing the stalks, as hereinafter explained.

In the accompanying drawings, A represents the main frame or tongue and seat frame, composed of the side bars $A^1$ and front and rear bars $A^2$.

The bars $A^1$ extend back beyond the rear bar $A^2$, and are connected rigidly to the axle B by means of straps $b$. C are the wheels, which have mounted upon or cast with them cog or gear wheels $C'$, for driving the cutter-shaft. D is the cutter-frame, composed of the front and rear bars $D^1$ and side bars $D^2$, said frame being connected with the axle in such manner as to be free to vibrate thereon. E is the shaft to which the gathering and cutting knives are connected, said shaft having its bearing in the end bars $D^2$ of the frame D, and being free to turn therein. F are the gathering and cutting knives, secured in position on the shaft E by means of hubs $e$ $e$.

These cutting and gathering knives are arranged four or more to each hub, and in pairs, $e^2$ $e^3$ $e^4$, each pair cutting together—that is to say, the knives in the center hubs, $e^2$, acting first upon the stalks and cutting together, and then one upon each side, $e^3$ $e^3$, following, these two cutting together, and so on outward throughout the series, in such manner that, as the center ones are cutting, the succeeding knives on each side shall be picking up the stalks and carrying them upward and forward to be acted upon and cut, giving a reversed spiral arrangement to the knives from the center of the shaft. G are the stationary knives, one for each set of rotating knives, said knives G being connected, at their forward ends, to the forward bar $D^1$ of the vibrating frame D, and extending backward to the hubs $e$. Upon each end of the shaft E are mounted pinions $E'$, which engage with the gear-wheels $C'$ on the main driving-wheels C. The pinions are connected to the shaft by means of backing ratchets or clutches, and are provided at their inner sides with grooves $g$, in which the forks of shipping-levers H fit, said shipping-levers extending back, and having their pivots at the side of the bars $D^2$, and the rear end of said lever being connected to arms or bars $H'$ at right angles thereto, which pass through perforations or holes in the bars $D^2$.

The rear ends of the bars $H'$ are bent at right angles to the bar $D^2$, and rest against the curved face of inclined or curved bar I, connected rigidly to the frame A, and in such manner that, as the frame D is raised from the ground, the bars $H'$ are forced outward by the inclined face of the bar I, and, in turn, cause the shipping-levers to force the pinions $E'$ inward on their shaft, and out of engagement with the clutches on the shaft E. K is a lever, mounted and having its fulcrum upon a rear extension of the frame A, and connected, at its rear end, by means of a link, $K^1$, to the vibrating frame D, and at its forward end it is connected to a rack-standard, $K^2$, mounted on the frame A, said forward end being secured at any desired point on the rack-standard by means of a spring-pawl.

The rotating knives F are secured in such manner that when they revolve they shall pick up the stalks and carry them forward in the direction the machine is moving, and the stationary knives are curved downward from the bar $D^1$ to the shaft E. Thus the cutting-edges of both the stationary and revolving knives, when cutting, are curved in the same direction, giving them a long shearing cut. L is a runner or shoe for turning down the stalks and presenting them to the rotating knives in proper position to be acted upon thereby. This runner or shoe is made in the V form shown in dotted lines, Fig. 1, and, extending upward at its forward end, as shown at $l$, is connected to the pole or tongue M, the rear open ends of said shoe being connected to a rear extension of the tongue M by means of a Y-shaped arm, $l'$, the upper end of which passes through a slot in the tongue M.

The parts $l$ $l^1$ are provided at their upper ends with a series of holes or perforations, $l^2$, through which they are secured to the tongue by means of a bolt or pin, said holes or perforations permitting the forward or rear end of the runner or shoe to be adjusted up or down, for regulating the angle at which said runner or shoe shall be presented to the ground.

Having now described my invention, what I claim as new, and desire to secure by Letters Patent, is—

1. The combination, with the stationary knives G, of the curved rotating knives F, operating to pick up the stalks from the ground, and to carry them forward and cause the same to be cut against said knives G, as described.

2. The curved rotating gathering-knives F, having the reversed spiral arrangement whereby they are made to cut in pairs, as described, in combination with the curved stationary knives G, arranged substantially as described.

3. In a corn-stalk cutter, the combination of the curved rotating gathering-knives F and curved stationary cutters G with the vibrating adjustable cutter-frame D, for adapting said cutters to be set nearer to or farther from the ground, as described.

JONATHAN P. BROWER.

Witnesses:
G. W. CRUM,
THOMAS W. MARTIN.